July 18, 1933. W. G. HARTWIG 1,918,265
BALANCED FUEL CONTROL FOR FURNACES
Filed Feb. 17, 1932 2 Sheets-Sheet 1
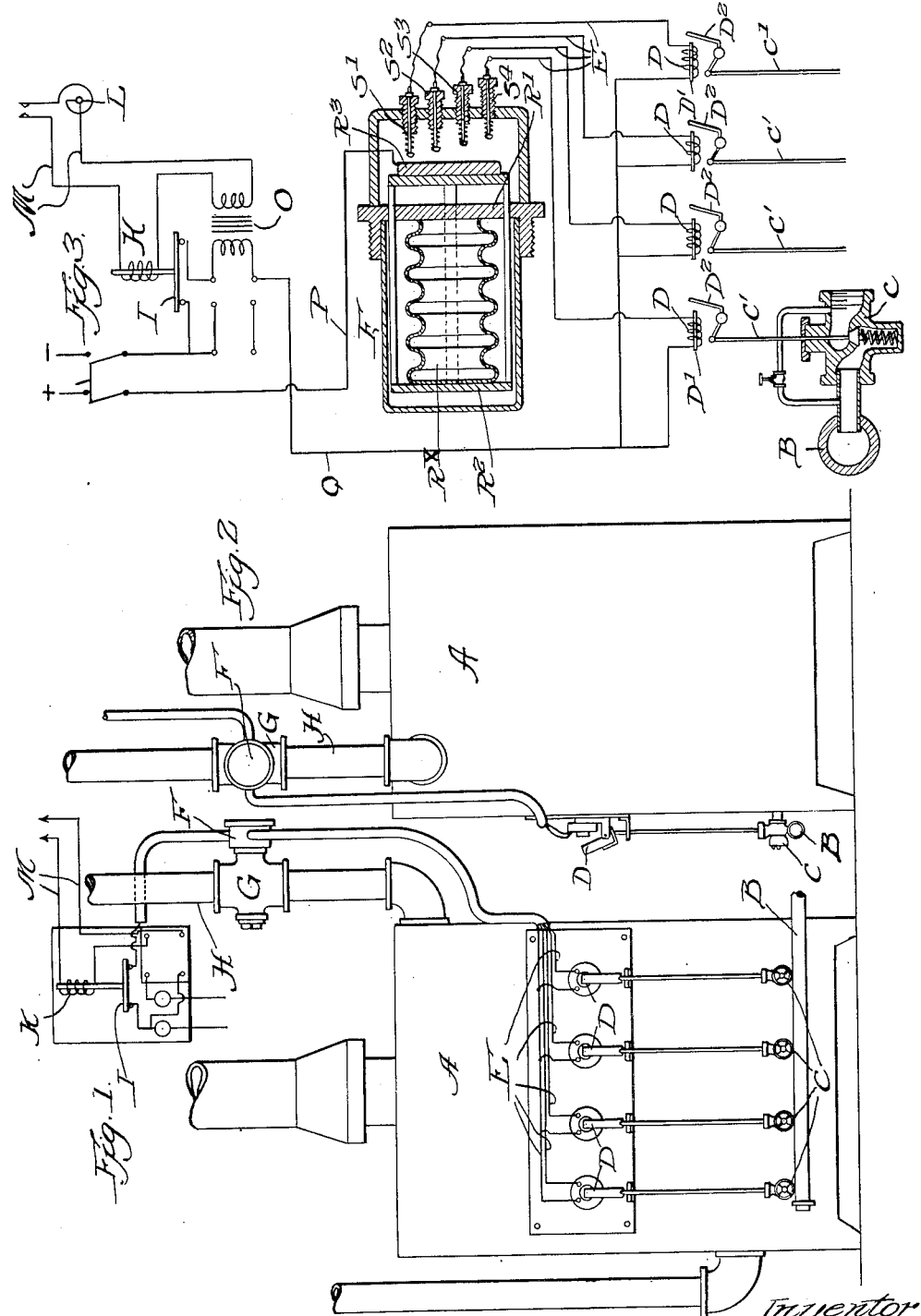
Witness:
R. B. Davison
Inventor:
William G. Hartwig
By Wilkinson Huxley Byron v Knight
Attys

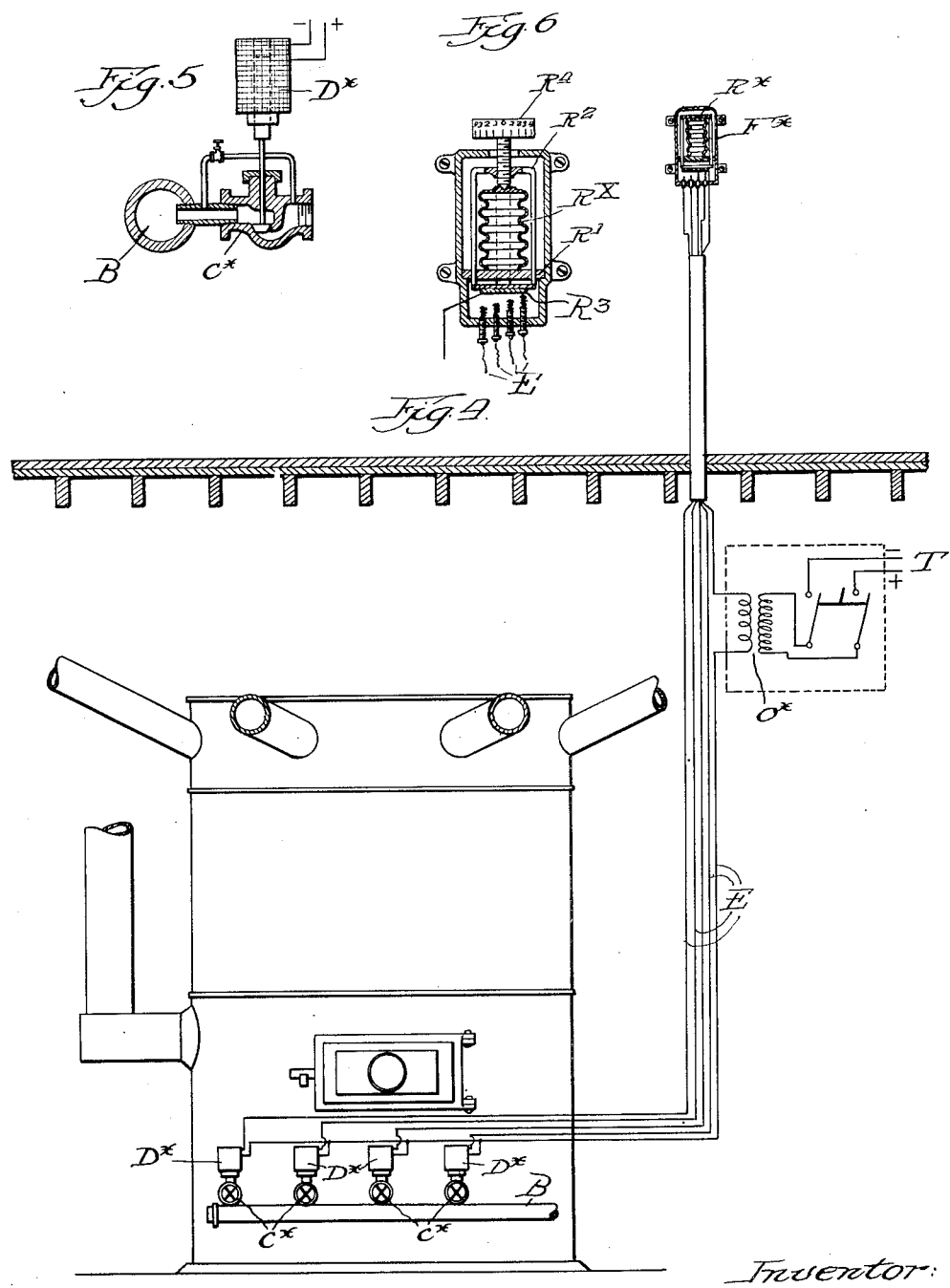

Patented July 18, 1933

1,918,265

UNITED STATES PATENT OFFICE

WILLIAM G. HARTWIG, OF CHICAGO, ILLINOIS, ASSIGNOR TO RAILWAY UTILITY COMPANY, OF CHICAGO, ILLINOIS, A CORPORATION OF ILLINOIS

BALANCED FUEL CONTROL FOR FURNACES

Application filed February 17, 1932. Serial No. 593,544.

This invention related to the operation of furnaces of the type which, for the sake of insuring proper mixture of fuel and its combustion supporting medium, have their burner capacity subdivided into a battery of relatively small, constant volume burner units which are turned on and off for controlling the total volume of heat generated, as distinguished from a burner or burners of variable capacity turned up and down to cause one and the same burner to consume more or less fuel in varying the furnace output.

The object of this invention is to provide a method of and apparatus for controlling the consumption of fuel in furnace burners of the constant volume, on-and-off, unit battery type, which shall involve a novel principle which is more rational than systems of combustion heretofore employed. One characteristic of the novel system of combustion is the maintenance, in the furnace, of continuous combustion of a smaller fuel flow, giving a heat output continuously commensurate with the heat losses that fix the demand upon the furnace and therefore maintaining a more even temperature in the heated space, as distinguished from intermittent combustion of a larger fuel flow, giving an aggregate heat output which, while commensurate with aggregate heat losses in a given cycle of operation, is not continuous and therefore maintains a temperature in the heated space that fluctuates between two points, respectively, above and below a certain mean, and separated by the number of degrees of thermometric reading above the thermostatic limit, attained by the space in absorbing heat stored in the furnace and heat vehicle at the time the thermostat interrupts combustion, plus the number of degrees below the thermostatic limit to which the space temperature drops while waiting for the cooled furnace and heat vehicle to regain transmitting temperature after the thermostat, in response to the cooling of the space, reestablishes combustion of the fuel. Another characteristic of the system of combustion of the present invention is the thermostatic varying of the number of constant output burner units called into play, as distinguished from varying the duration of the intervals of combustion and non-combustion of all the burners in compensating for changes in external atmospheric temperatures or other heat-consuming influences. Thus, the invention may be said to contemplate the automatic selection of a number of continuously burning, constant output, burner units whose aggregate of heat generation will balance what might be termed the coefficiency of heat loss of the heated space, and the limiting of the thermostatic function to the introduction or cutting out of units in such a burner only as the coefficiency of heat loss is varied, whether by voluntary ventilation or external atmospheric influences.

The thermostatic governing of the system thus far referred to is separate and distinct from or in addition to timed governing which may be used in connection with the system of the present invention to maintain a relatively low temperature in the heated space during hours of unoccupancy as in ordinary controlled heating systems, and in the present invention the timed control would act to shift the control element of the burner unit varying means so that the latter will cut in and out burner units in response to relatively high and low predetermined mean thermometric readings desired in the heated space during hours of occupancy and unoccupancy.

The invention proceeds upon the principle of independently controlling individual fuel supply lines leading to the respective units of a battery of constant volume, on-and-off burners, by actuators responsive, separately and successively, to a continued movement of a thermostatic means in a manner to cause the number of units to be increased or decreased until their aggregate output balances the heat loss of the heated space under a given condition of surrounding atmosphere or other heat consuming environment, and causing this response to be manifested through the medium of thermostatic means subjected to either the atmosphere of the space to be heated or a fluid vehicle employed for transmitting heat units from the burners to the said space; and the invention resides in the method of control characterized by this operative principle as well as in instrumentalities functioning in accordance therewith.

In the accompanying drawings, illustrating the preferred embodiment of the invention which uses valved gas conduits as the individual fuel supplies, electromagnets as the actuators for said valves, a series of circuit closers connected by separate circuits with said actuators, and a thermostatically moved contact member successively encountering said circuit closers successively by continued movement of the contact—

Figure 1 is a front elevation of a heating apparatus in which the thermostatic element of the invention is introduced into the riser of a furnace using steam or water as a heat conveying vehicle, and employing also a secondary control related to all the burners and intended to be connected with and become subject to the thermostatic means in the space that is to be heated.

Figure 2 is an end elevation of the furnace shown in Figure 1, minus the secondary control.

Figure 3 is a view, partly schematic, including the secondary control with its space thermostat and a transformer for stepping down the current; the primary thermostat in section on an enlarged scale; the actuators and their circuits; and a typical fuel control valve.

Figure 4 is a view, partly schematic, of a modification of the invention in which the primary thermostat is located in the space to be heated and serves alone to control the burner actuators.

Figure 5 is a sectional view showing a solenoid actuated valve which may be substituted for the valve and actuator shown in Figure 3; and Figure 6 is a detail view of a modified construction of primary thermostat, including a manual adjustment for selectively determining a mean temperature, changes from which will cause the thermostat to influence the fluid valve.

Referring to Figures 1 to 3, inclusive, A represents a furnace, B a fuel gas supply, and C a series of independently operable valves for releasing and interrupting flow of fuel from said supply B to a corresponding number of burners assumed to be arranged within the furnace, with constantly available pilot or other ignition means. Each valve C is under control of an individual actuator D which is of electro-magnetic type and connected by a corresponding number of circuit wires E with thermostatic device F, which, in this instance, is introduced through the medium of an appropriate housing G into the riser H of furnace A. All of said actuators D are dependent also upon a single circuit closer I, which is in turn actuated by a solenoid K that is responsive to a room thermostat L (Figure 3) connected with said solenoid by wires M.

O represents, conventionally, a transformer through means of which current may be stepped down from the main circuit P, Q, appropriately for use in the thermostat L. Thermostat L, located in the space to be heated, and its circuit closer I in the main circuit P, Q, constitute a secondary control which prevents any of the burner units from going on until the space temperature falls below a predetermined degree.

The primary thermostat F may comprise any appropriate expansible element $Rx$ which, in the present instance, is anchored to a base plate R' and is connected at its movable end with yoke R2 working through said base plate and carrying upon its outer end a contact plate R3 which cooperates with circuit closers S', S2, S3 and S4 to close the circuits through the wires E leading to actuators D. But circuit closers S', S2, S3 and S4 are so positioned that they will meet the moving contact R, successively, by a continued movement of said contact so that only one or more of the actuators will be energized, and only a number of the burners will go on, corresponding to the temperature of the environment (in this instance, the heat vehicle in riser H) which influences the expanding element R; and when said expanding element reaches a position of equilibrium determined by the said temperature, a number of unit burners will be in operation commensurate with the rate at which the influencing medium is losing its temperature. The screw threaded adjustable nature of terminals S', S2, S3 and S4, as shown in Figure 3, permits this to be readily established.

Actuators D are illustrated in Figure 3 as electromagnets D' attracting armatures D2 in the form of levers connected by rods C' with their respective valves C.

As shown in Figures 4 and 5, the actuators may be in the form of solenoids $Dx$ controlling valves $Cx$, structurally modified to cooperate with said solenoids; the primary thermostat $Fx$ may be located in the room or space to be heated; and the transformer $Ox$ may be used to step the current down to the service line T appropriately for all of the actuator circuits. In this layout of the invention the secondary thermostatic control is omitted, and by the location of the primary thermostat in the space to be heated, the system is simplified in its form and rendered more satisfactory for systems in which air is used as the vehicle from the burners to the heated space.

As shown in Figure 6, instead of adjusting the individual terminals S', S2, S3 and S4, as in Figure 3, the yoke $Rx$ may be provided with an adjusting screw R4 for giving any desired initial position to the contact plate R3 relatively to the terminals S', S2, S3 and S4, and thereby determining the mean temperature at which it may be desired to hold the environment which influences the primary thermostat.

In all forms of primary thermostat, each terminal S', S2, S3 and S4 includes a spring V that enables it to yield to contact R3 in order not to resist full range of movement of the expansible element Rx.

What is claimed is:

1. A furnace control system, comprising a fuel supply, a plurality of independently valved burners adapted to receive fuel from said supply and deliver heat to said furnace, an individual electric actuator for the valve of each burner, an independent electric circuit for each actuator, an independently yielding terminal for each circuit, a circuit closer common to all the terminals but encountering them successively by continued movement in one direction, and a single thermostatically impelled actuator for said closer.

2. A furnace control system as described in claim 1, in which the valves have springs normally forcing them to closed position, and each actuator holds its valve open only so long as it is electrically energized.

WILLIAM G. HARTWIG.